US00RE33895E

United States Patent [19]

Röck

[11] E Patent Number: Re. 33,895

[45] Reissued Date of Patent: Apr. 21, 1992

[54] PULL-OUT GUIDE FOR DRAWERS

[75] Inventor: Erich Röck, Höchst, Austria

[73] Assignee: Julius Blum Gesellschaft m.b.H., Höchst, Austria

[21] Appl. No.: 654,668

[22] Filed: Feb. 13, 1991

Related U.S. Patent Documents

Reissue of:

[64] Patent No.: 4,952,074
Issued: Aug. 28, 1990
Appl. No.: 433,203
Filed: Nov. 8, 1989

[30] Foreign Application Priority Data

Nov. 10, 1988 [AT] Austria ..... 2752/88

[51] Int. Cl.[5] ..... F16C 29/04
[52] U.S. Cl. ..... 384/19; 384/53
[58] Field of Search ..... 384/19, 18, 21, 22, 384/53; 312/350

[56] References Cited

U.S. PATENT DOCUMENTS

| | | | |
|---|---|---|---|
| 3,901,564 | 8/1975 | Armstrong | 384/18 |
| 4,089,567 | 5/1978 | Röck et al. | 384/19 |
| 4,601,522 | 7/1986 | Röck et al. | 384/19 |
| 4,659,237 | 4/1987 | Rapp | 384/19 |

*Primary Examiner*—Lenard A. Footland
*Attorney, Agent, or Firm*—Wenderoth, Lind & Ponack

[57] ABSTRACT

A pull-out guide assembly for [drawers comprising] *a drawer includes* a pull-out rail fastened to the drawer, a supporting rail fastened to the body of [the piece] *an article* of furniture and a center rail differentially running between [said] *such* two rails on each side of the drawer. Running carriages which hold load-transmitting running rollers are arranged between [said] *the* rails. Driving rollers which run on the supporting [rails] *rail* and on the pull-out [rails] *rail* are mounted on the center [rails] *rail*. The center [rails have Z-profiles] *rail has a Z-shaped profile*, and the supporting [rails] *rail* and the pull-out [rails] *rail* have [U-profiles] *U-shaped profiles* which are substantially half-covered.

14 Claims, 4 Drawing Sheets

PULL-OUT GUIDE FOR DRAWERS

Matter enclosed in heavy brackets [ ] appears in the original patent but forms no part of this reissue specification; matter printed in italics indicates the additions made by reissue.

FIELD AND BACKGROUND OF THE INVENTION

The invention relates to a pull-out guide assembly for [drawers] *a drawer and* comprising a pull-out rail *to be* fastened to the drawer, a supporting rail *to be* fastened to the body of [the piece] *an article of* furniture and a center rail differentially running between [said] *such* two rails on each side of the drawer, running carriages holding load-transmitting cylindrical bodies being arranged between [said] *the* rails, and driving rollers running on the supporting [rails] *rail* and on the pull-out [rails] *rail and* mounted on the center [rails] *rail.*

A pull-out guide assembly of the afore-mentioned kind allows substantially full extraction of the drawer from the [body of the piece of] furniture *body* and hence guarantees optimal access to the contents of the drawer.

An example of such a drawer is described in U.S. Pat. No. 3,901,564[. Steel], *wherein steel* balls which are held in cages are used as cylindrical bodies in the pull-out guide assembly [described in the cited Patent.]. These steel balls require relatively complicated profiles the supporting rails and of the pull-out rails. Furthermore, no run-in means for the drawer is provided because of the rail profiles.

To be able to use simpler rail profiles in connection with the same loading capacity, ball bearings would have to be used instead of steel balls according to the known state of the art. Ball bearings cause, however, a considerable increase [of costs] *in cost.*

SUMMARY OF THE INVENTION

It is the object of the invention to provide a pull-out guide assembly which guarantees smooth running of a drawer carrying heavier loads and allows the use of simple running rollers.

According to the invention this is achieved in that the center [rails have Z-profiles] *rail has a Z-shaped profile*, and the supporting [rails] *rail* and the pull-out [rails] *rail* have [U-profiles] *U-shaped profiles* which are substantially half-covered and upwardly or downwardly open.

In the embodiment according to the invention, the diversion of forces takes place directly via cylindrical bodies in the form of running rollers, each [of said] *such* cylindrical [bodies]ep *body* corresponding to the cylinder of a roller bearing. There is no load acting on the axles of the driving rollers, and there is no axle friction. Furthermore, only low pull-out forces are required.

It is advantageously provided that the driving rollers are received in the profile of the supporting rail.

An embodiment of the invention provides that the cylindrical bodies which are designed as running rollers have substantially half the diameter of the driving rollers.

It is further provided that the running rollers are arranged in the supporting [rails] *rail* and the driving rollers at opposite sides of the center rail.

One embodiment of the invention provides that in the inserted position of the drawer, two [times] *arrangements of* two running rollers and one driving roller are arranged on [a] common vertical [line] *lines* on each side of the drawer.

BRIEF DESCRIPTION OF THE ]FIGURES OF THE DRAWING] *DRAWINGS*

In the following an embodiment of the invention will be described in more detail with references to the [figures of the drawing] *accompanying drawings,* in which:

Figure 1 [shows] *is* a diagrammatic side view of a pull-out guide assembly, [the] *a* drawer being in [the] *an* inserted position, Figure 2 [shows] *is* a side view of the pull-out guide assembly [according to the invention], the drawer being shown extracted from the body of [the piece] *an article* of furniture, Figure 3 [shows] *is* a cross-sectional view of [a] *the* pull-out guide assembly according to the invention on one side of the drawer, and Figure 4 [shows] *is a schematic view showing* a mounting arrangement of the pull-out guide assembly according to the invention.

DESCRIPTION OF THE PREFERRED EMBODIMENT

The pull-out guide assembly according to the invention comprises on each side of [the] *a* drawer [the] *a* supporting rail 17 on the side of [the] *a furniture* body, [the] *a* pull-out rail 18 on the side of the drawer and [the] *a* center rail 19 running between [said] *the* two rails, 17, 18.

Figure 1:
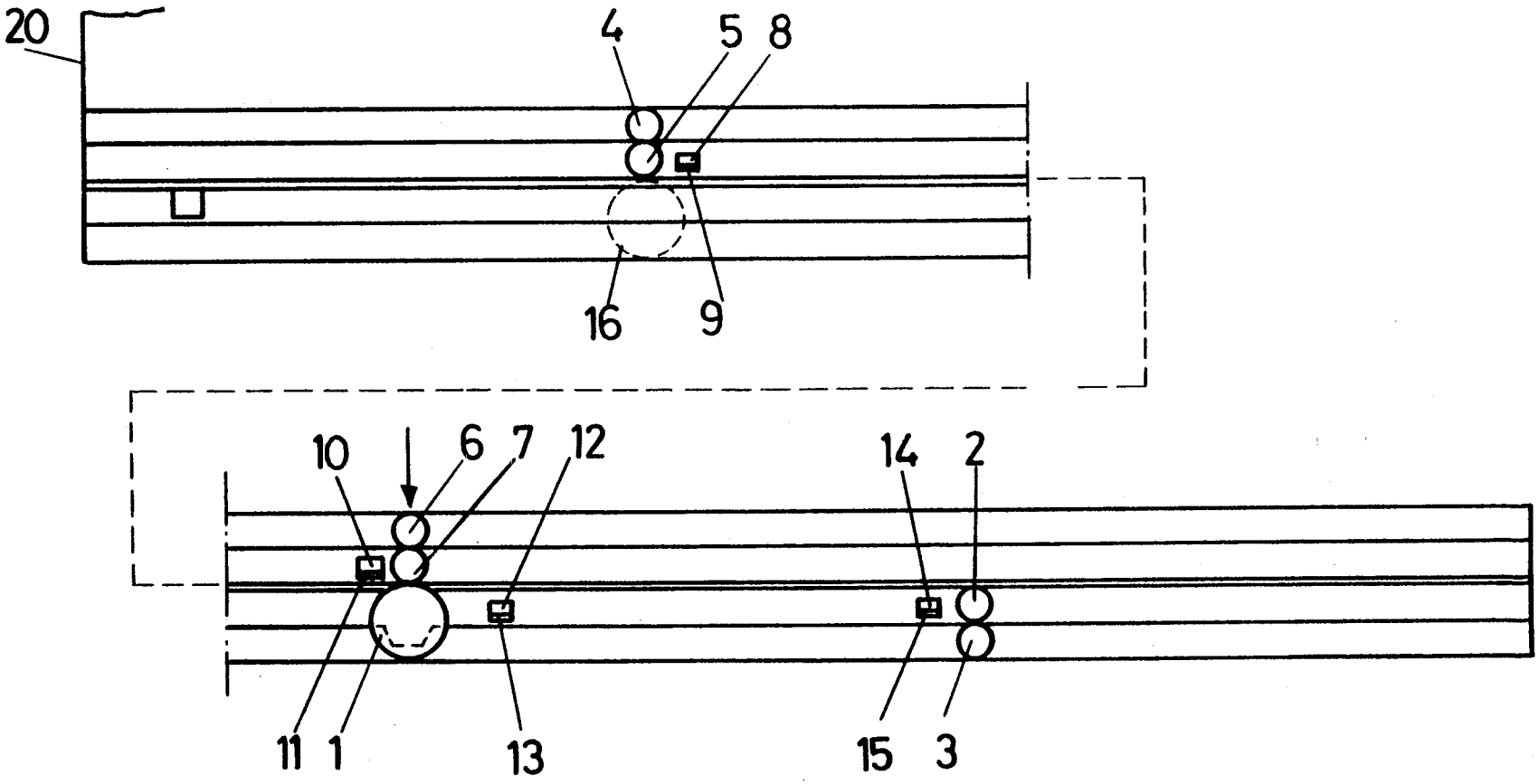
Figure 2:
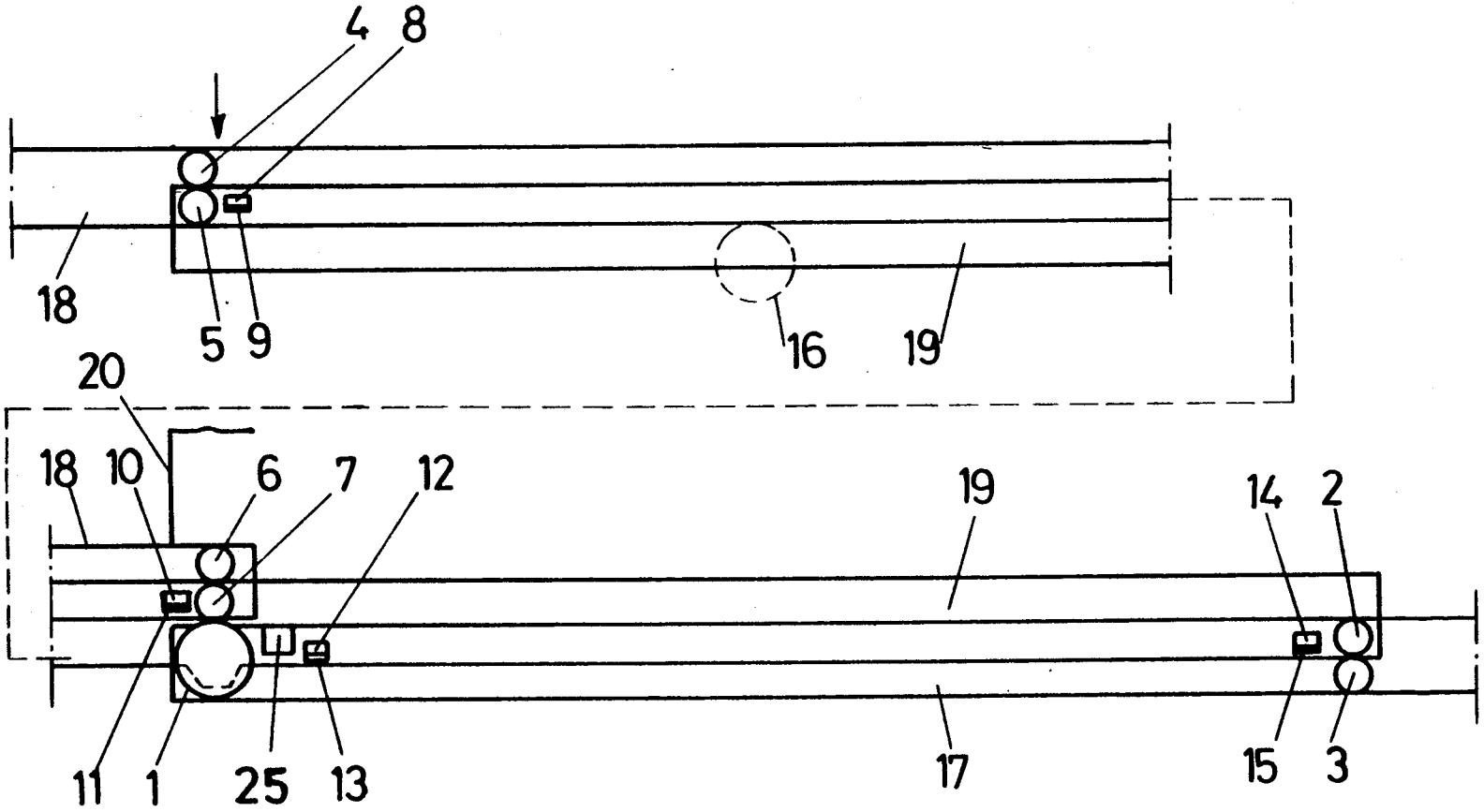

The pull-out guide assembly permits almost full extraction of the drawer, which is [anchored in] *connected to* the guide [means] *assembly,* from the body of the piece of furniture. Excessive extraction does not occur, however. In FIG. 2, *a front edge of* the body [front edge] is designated with reference number 20. This figure also shows that the rear end of the pull-out rail 18 is in its extreme front position still in the region of the body of the piece of furniture.

Figure 3:
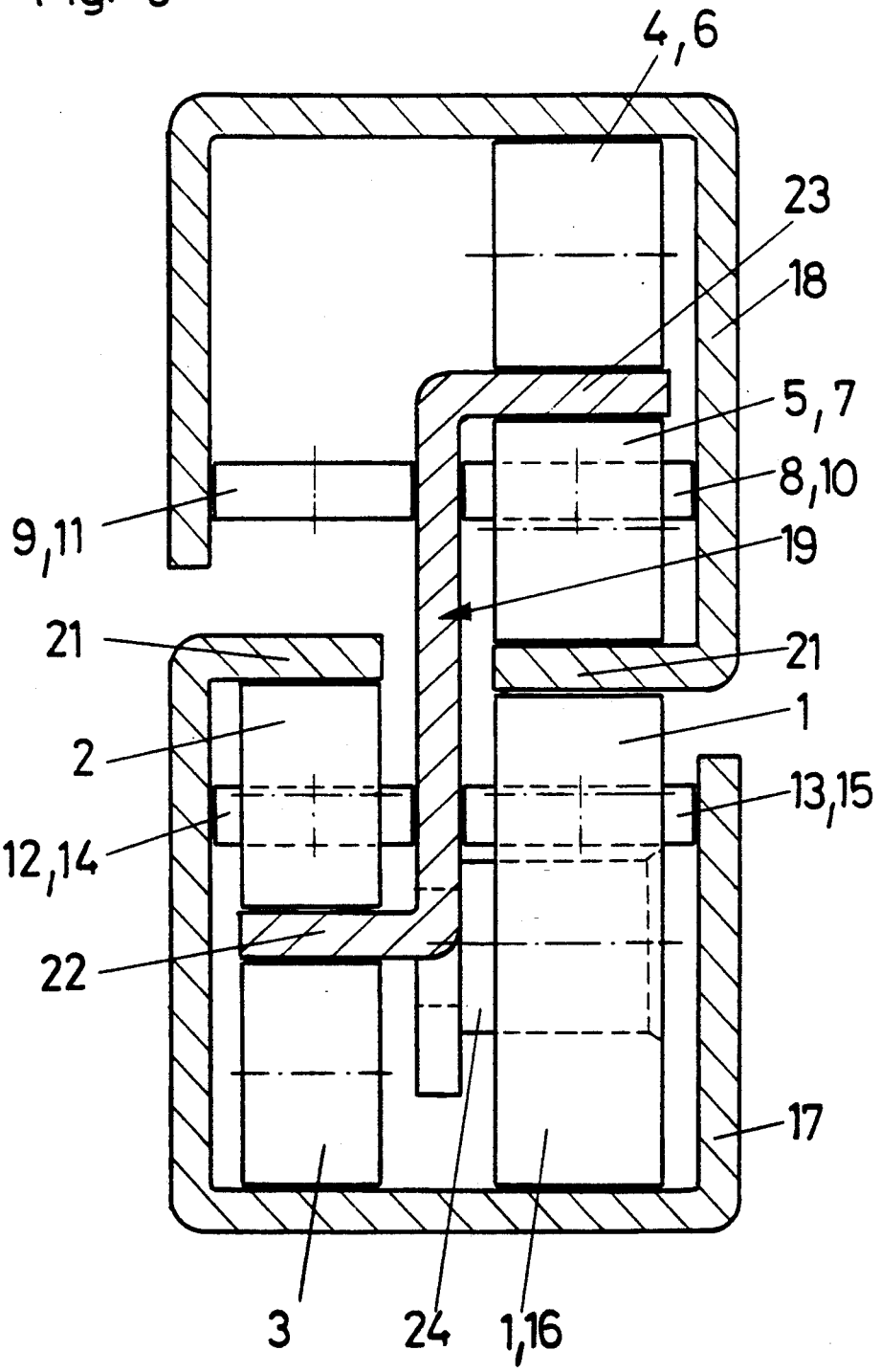

As can be seen from FIG. 3, the supporting rail 17 and the pull-out rail 18 have identical [U-profiles] *U-shaped profiles* which are half-covered by flanges 21, the rails 17, 18 being turned [in] *with* respect [of] *to* each other by 180°.

The center rail *19* has a [Z-profile] *Z-shaped profile* and projects in this arrangement with half of its profile into the pull-out rail 18 and *half* into the supporting rail 17. [The horizontal] *Horizontal* flanges 22, 23 of the center rail 19 form [the] running flanges for the running rollers 2, 3, 4, 5, 6 and 7. The running rollers 2–7 are held in cage-like running carriages which are not shown.

Two driving rollers 1 and 16 are mounted [at ] *on* the center rail 19 by means of axles 24. The driving rollers 1, 16 run directly between the supporting rail 17 and the *flange 21 of* pull-out rail 18 [(flanges 21)], and [there acts no load upon axle] *axles* 24 *have no load acting thereon.*

The driving roller 16 is mounted on the center rail 19 advantageously with clearance and prevents a tilting [clearance] of the drawer[,] when [the latter-mentioned] *it* is in the inserted position.

Laterally acting compensating rollers 8,9,10,11,12,13,14,15 which guarantee the lateral stability of the drawer are mounted in the running carriages.

Means 25 preventing lifting of the center rail 19 are provided at the front end of the supporting rail 17.

The driving rollers 1, 16 as well as the running rollers 2–7 are advantageously made of plastics material. Hence the supporting rail 17, the pull-out rail 18 and the center rail 19 can be plastic-coated without causing damage to the coating when the drawer is in use.

Figure 4:
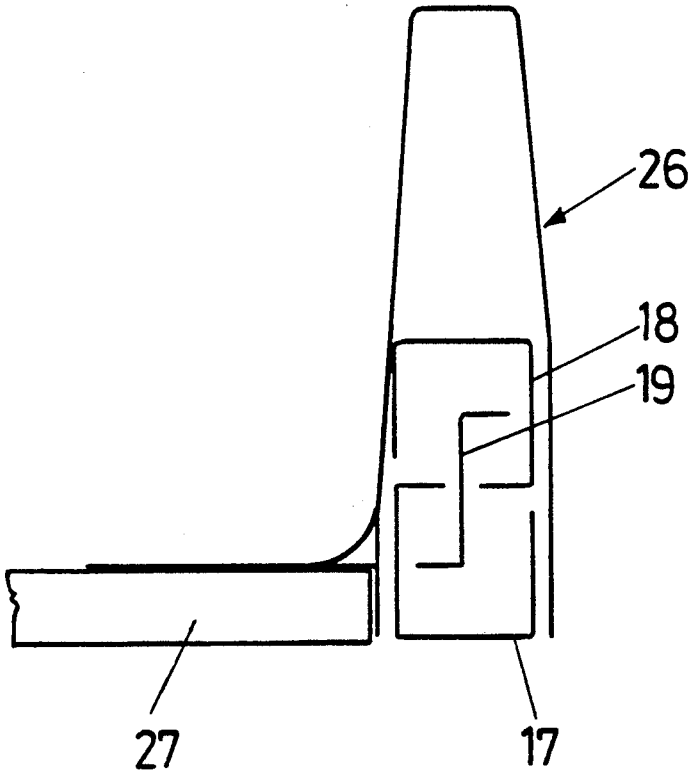

As can be seen from FIG. 4, the pull-out guide assembly according to the invention may advantageously be mounted in a drawer with double side walls 26. In Fig. 4, the drawer bottom is designated with reference number 27.

What is claimed is:

1. A pull-out guide assembly for [drawers] *a drawer and* comprising, *for each side of the drawer:* a pull-out rail *to be* fastened to the drawer[,]*;* a supporting rail *to be* fastened to the body of [the piece] *an article* of furniture [and]*;* a center rail differentially running between said [two] *pull-out and supporting* rails [on each side of the drawer,]*;* [running carriages holding] load-transmitting cylindrical bodies [being] arranged between said rails[, and]*;* driving rollers running on [the] *said* supporting [rails] *rail* and on [the] *said* pull-out [rails being] *rail and* mounted on [the] *said* center [rails, wherein] *rail;* said center [rails have Z-profiles] *rail having a Z-shaped profile;* and said supporting [rails] *rail* and said pull-out [rails have U-profiles] *rail having U-shaped profiles* which are substantially half-covered and *which are respectively* upwardly and downwardly open.

2. A pull-out guide assembly as claimed in claim 1, wherein said driving rollers are received in the profile of said supporting rail.

3. A pull-out guide assembly as claimed in claim 1, wherein [the] *said* cylindrical bodies [which are designed as] *comprise* running rollers [have] *each having a diameter* substantially half the diameter of said driving rollers.

4. A pull-out guide assembly as claimed in claim 2 wherein *some of* said [running rollers] *cylindrical bodies* are arranged in said supporting [rails] *rail*, and said driving rollers are arranged at *an* opposite ]sides] *side* of said center rail *from said some cylindrical bodies.*

5. A pull-out guide assembly as claimed in claim 1, *wherein said cylindrical bodies and said driving rollers are arranged such that,* in [the] *an* inserted position of the drawer, *there are* two [times] *arrangements of* two [running rollers] *cylindrical bodies* and one driving roller [are arranged on a] *aligned along respective* common vertical [line on each side of the drawer] *lines.*

6. A pull-out guide assembly as claimed in claim 1, wherein said supporting rail and said pull-out rail have identical profiles and are [in], *with* respect [of] *to the orientation of* the profiles *thereof,* turned [in] *with* respect [of] *to* each other by 180°.

*7. A pull-out guide assembly as claimed in claim 1, wherein said cylindrical bodies are arranged in running carriages.*

*8. In an article of furniture including a furniture body, a drawer movable into and out of said furniture body, and pull-out guide assemblies on opposite sides of said drawer for guiding movement thereof relative to said furniture body, the improvement wherein each said pull-out guide assembly comprises:*

*a pull-out rail fastened to said drawer;*

*a supporting rail fastened to a respective side of said furniture body;*

*a center rail differentially running between said pull-out and supporting rails;*

*load-transmitting cylindrical bodies arranged between said rails;*

*driving rollers running on said supporting rail and on said pull-out rail and mounted on said center rail;*

*said center rail having a Z-shaped profile; and*

*said supporting rail and said pull-out rail having U-shaped profiles which are substantially half-covered and which are respectively upwardly and downwardly open.*

*9. The improvement claimed in claim 8, wherein said driving rollers are received in the profile of said supporting rail.*

*10. The improvement claimed in claim 9, wherein some of said cylindrical bodies are arranged in said supporting rail, and said driving rollers are arranged at an opposite side of said center rail from said some cylindrical bodies.*

*11. The improvement claimed in claim 8, wherein said cylindrical bodies are arranged in running carriages.*

*12. The improvement claimed in claim 8, wherein said cylindrical bodies and said driving roller are arranged such that, in an inserted position of said drawer, there are two arrangements of two cylindrical bodies and one driving roller aligned along respective common vertical lines.*

*13. The improvement claimed in claim 8, wherein said supporting rail and said pull-out rail have identical profiles and are, with respect to the orientations of the profiles thereof, turned with respect to each other by 180°.*

*14. The improvement claimed in claim 8, wherein said cylindrical bodies comprise running rollers each having a diameter substantially half the diameter of said running rollers.*

* * * * *